United States Patent [19]

Faloon et al.

[11] Patent Number: 5,575,552

[45] Date of Patent: Nov. 19, 1996

[54] LIGHTED MIRROR APPARATUS

[75] Inventors: Michael D. Faloon, Northville; Arthur W. Hess, Troy; Carmen P. Jackson, Huntington Woods, all of Mich.

[73] Assignee: United Technologies Automotive Systems, Inc., Dearborn, Mich.

[21] Appl. No.: 352,495

[22] Filed: Dec. 9, 1994

[51] Int. Cl.$^6$ .................................................. B60Q 3/00
[52] U.S. Cl. ........................ 362/83.1; 362/135; 362/140; 359/839
[58] Field of Search ................................ 362/83.1, 135, 362/136, 137, 140, 80, 62, 32; 359/359, 360, 362, 602, 603, 608, 839, 884

[56] References Cited

U.S. PATENT DOCUMENTS

| | | | |
|---|---|---|---|
| 2,790,350 | 4/1957 | Cameron | 359/603 X |
| 4,274,078 | 6/1981 | Isobe et al. | 340/98 |
| 4,630,904 | 12/1986 | Pastore | 340/98 X |
| 4,882,565 | 11/1989 | Gallmeyer | 362/83.1 X |
| 4,906,085 | 3/1990 | Sugihara et al. | |
| 5,014,167 | 5/1991 | Roberts | 362/83.1 |
| 5,076,674 | 12/1991 | Lynam | 359/603 X |
| 5,124,845 | 6/1992 | Shimojo | 359/838 |
| 5,179,471 | 1/1993 | Caskey et al. | 359/603 X |
| 5,207,492 | 5/1993 | Roberts | 362/30 |
| 5,313,335 | 5/1994 | Gray et al. | 362/83.1 X |
| 5,373,392 | 12/1994 | Bala | 359/839 X |
| 5,416,313 | 5/1995 | Larsen | 359/839 X |

FOREIGN PATENT DOCUMENTS

| | | |
|---|---|---|
| 2806468 | 8/1978 | Germany . |
| 2161440 | 1/1986 | United Kingdom . |

*Primary Examiner*—Denise L. Gromada
*Assistant Examiner*—Thomas M. Sember
*Attorney, Agent, or Firm*—Howard & Howard

[57] ABSTRACT

A lighted mirror apparatus includes a mirror glass having one or more lighting sections. The mirror glass has a pyrolyric coating on the front surface and an opaque backmasking on the rear surface. Semi-transparent material, such as light control film, may be disposed on the rear surface of the mirror glass on the lighting sections. The lighting sections are normally highly reflective of ambient light, and thus provide additional mirror surface when the lights are deactivated. The lighting sections transmit light from one or more light sources disposed behind the mirror glass when the light sources are activated. Two lighting sections are preferably provided, with one at each end of the mirror surface. Several embodiments are disclosed.

20 Claims, 1 Drawing Sheet

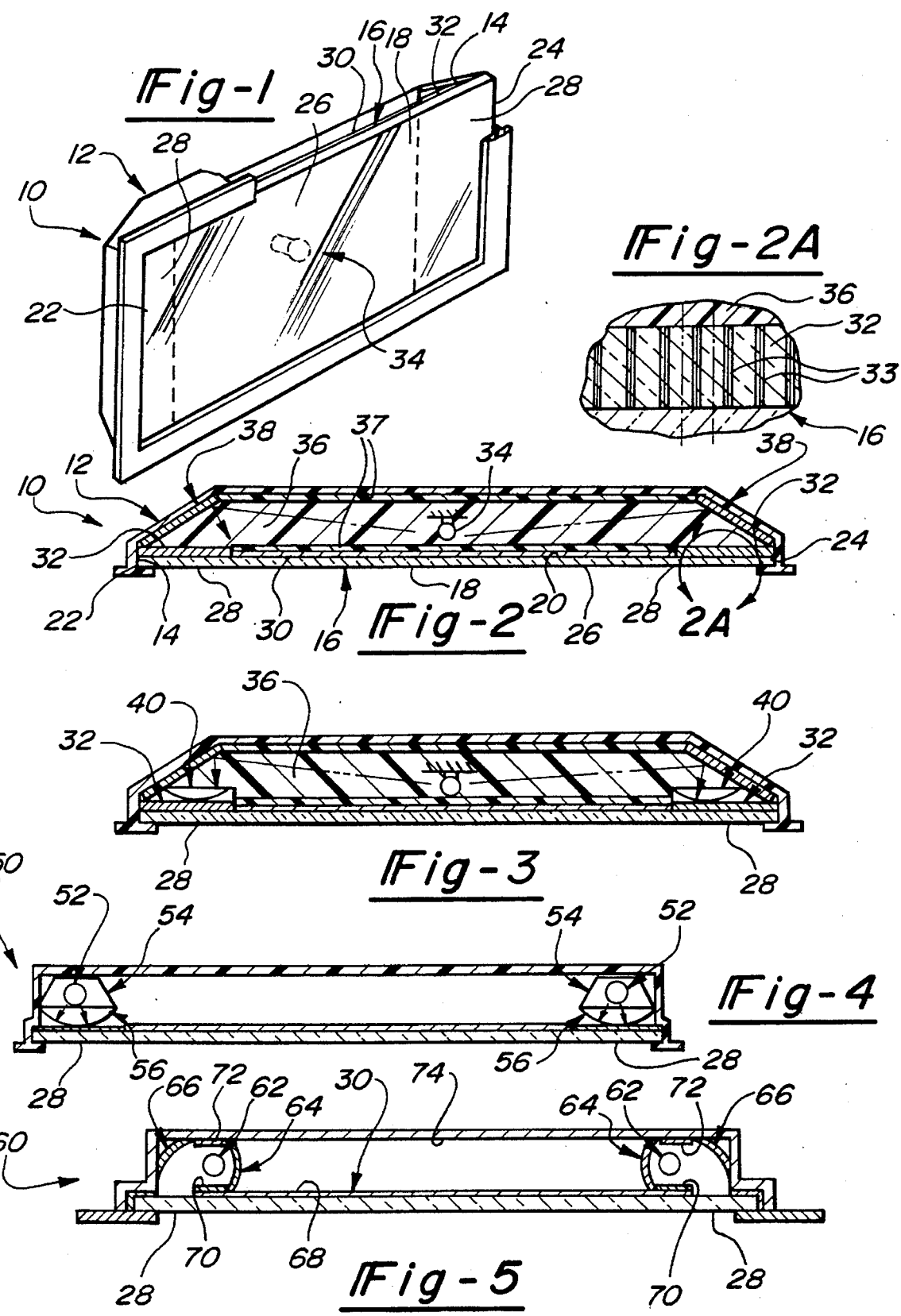

5,575,552

LIGHTED MIRROR APPARATUS

BACKGROUND OF THE INVENTION

The present invention relates to a lighted mirror apparatus which selectively projects light through sections of the mirror glass and is particularly useful as a lighted vanity mirror in an automotive vehicle.

Current motor vehicles include vanity mirrors on the visors on the passenger side and driver side of the vehicle. Lighted vanity mirrors typically include a light disposed on either side of the mirror glass. The lights are mounted in the visors with light-diffusing covers which detract from the aesthetics of the visor and mirror and increase the cost. Further, a smaller mirror surface must be used in order to accommodate the lights on the visor, making current vanity mirrors smaller than desired. A switch mounted on the visor allows the user to adjust the brightness of the lights between a high or low setting. However, current lights often are too harsh and even the low setting may temporarily "blind" the user, particularly in low light situations. More importantly, the light from the passenger vanity mirror can distract the driver of the vehicle or interfere with the driver's vision of the road at night.

Mirrors for non-vanity functions are known which incorporate a signal light behind the mirror surface. Such mirrors require special coatings and only project light of limited wavelengths. The mirrors and required special light sources are thus unduly expensive. Moreover, the limited wavelengths would not be suitable for a vanity mirror.

SUMMARY OF THE INVENTION

The present invention provides a lighted mirror apparatus which selectively projects light through lighting sections in the mirror glass. The lighting sections preferably comprise perimeter portions of the mirror glass. Preferably, lighting sections are formed at the ends of the mirror. When the light sources behind the lighting sections are deactivated, the lighting sections appear highly reflective and provide a larger, continuous reflective surface for the user.

Preferably, a mirror glass having a pyrolytic coating is utilized. When provided with an opaque backmasking, the pyrolytic coated mirror glass appears highly reflective. When provided with a semi-transparent backmasking, the front surface of the mirror glass normally appears highly reflective but the mirror glass will transmit light generated from behind the mirror glass to the front surface through the lighting sections. In the present invention, the mirror glass is provided with an opaque backmasking on the rear surface, except on the lighting sections. This renders the mirror highly reflective.

The lighting sections may be provided with a semi-transparent backmasking such as a light control film. The semi-transparent backmasking allows light to be transmitted through the mirror glass from behind the mirror glass through substantially the entire visual range and provides the mirror glass with a reflective surface when no light is generated from behind the mirror glass. The semi-transparent backmasking may be a light control film having embedded louvers to direct the light at predetermined angles and prevent light scattering to unwanted areas. For example, when the present invention is used as a vanity mirror in a motor vehicle, the passenger side mirror apparatus may concentrate the light on the passenger and reduce interference with the driver's vision of the road at night.

In one embodiment, a single light source mounted behind the opaque backmasking generates light which is carried by a light-transmitting medium to two lighting sections. Preferably the light-transmitting medium is an optically clear plastic wrapped in an inwardly-reflecting sheath. A reflective surface behind each lighting section reflects the light from the light-transmitting medium through the semi-transparent backmasking at the lighting section and forwardly through the mirror. Additional lenses or reflectors may be used to diffuse the light uniformly onto the lighting sections.

In another embodiment, each lighting section is provided with a light source mounted in a reflector behind the mirror glass. Lenses in front of the light sources diffuse and reduce the harshness of the light.

In another embodiment, a pair of light sources are disposed behind the opaque backmasking, one adjacent each lighting section. A black reflector mounted behind each lighting section reflects light generated by the light source through each lighting section and provides the front surface of the mirror glass with a reflective appearance when the light source is deactivated. Additional reflectors, lenses, or reflectively painted surfaces can be used to concentrate light from each light source onto each black reflector. In this embodiment, a semi-transparent backmasking on the rear surface of the lighting sections is not required but could be used to increase reflectance or provide light control.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a front view of a lighted mirror apparatus in accordance with the present invention;

FIG. 2 is a cross-sectional view along line 2—2 of the lighted mirror apparatus shown in FIG. 1;

FIG. 2A is an enlarged view of area 2A of the mirror apparatus of FIG. 2.

FIG. 3 is a cross-sectional view of an alternate embodiment of a lighted mirror apparatus in accordance with the present invention;

FIG. 4 is a cross-sectional view of an alternate embodiment of a lighted mirror apparatus in accordance with the present invention; and FIG. 5 is a cross-sectional view of an alternate embodiment of a lighted mirror apparatus in accordance with the present invention.

DESCRIPTION OF THE PREFERRED EMBODIMENT

A mirror apparatus 10 according to a first embodiment of the present invention, is shown in FIGS. 1–2. Although the invention will be described and illustrated as a vanity mirror for an automotive vehicle, it should be understood that the present invention could also be used for any application where a lighted mirror is desired, including non-automotive applications.

The mirror apparatus 10 includes a housing 12 having an aperture 14. This may be made of ABS plastic. A mirror glass 16 having a front surface 18, a rear surface 20, a left side 22, and a right side 24 is mounted in the aperture 14 of housing 12. A pyrolytic coating 26 is preferably formed on the front surface 18 of the mirror glass 16. The coating is preferably formed in an on-line pyrolytic process whereby several vaporized metal oxide and semiconductor oxide compounds are deposited onto the mirror glass 16.

One preferred pyrolytic coated glass is available from Libbey Owens Ford. A co-pending U.S. patent application, filed Nov. 3, 1994, and assigned application Ser. No. 08/333, 891 utilizes similar glass for an exterior mirror having an information display. This glass preferably has a layer that is silicon, with a second coating layer being a silica compound. A third, tin oxide layer is also utilized. The tin oxide, being harder than glass, provides the product with exceptional durability. These coatings and compositions may be altered in components as well as thickness to obtain specific performance criteria. The color of the glass can be altered by changing the thicknesses of the layers. The pyrolytic glass shows no degradation or change when tested for six minutes at 650° C. The pyrolytic glass experienced less than 1% change in reflectance and no loss of adhesion in a 1 kg Taber Abrader test for 1000 cycles. The glass showed no degradation after 1000 strokes of Gardner Abrasion (comet) or 100 strokes of abrasion with Bon-Ami. The glass showed no change or degradation when immersed in 1N sodium hydroxide for 30 minutes at 88° C. The glass showed no change or degradation in a cyclical temperature/high humidity test of 95% relative humidity, 35° C. to 75° C., for 100 cycles. No degradation or change was exhibited after four hours of immersion in boiling water. No degradation was exhibited after 150 hours of salt spray (ASTM B117-90). No change or degradation was exhibited after a Corrodkote test (ASTM B-1388-85). The mirror glass pass all requirement of Flabeg testing, and abrasion resistance exceeded that of chrome-coated mirrors.

The mirror glass 16 has higher durability than silver or chrome coated mirrors and is more environmentally safe. The mirror glass 16 has a first-surface reflectance of up to 85 percent when provided with an opaque black backmasking on the rear surface 20. When provided with a semi-transparent backmasking on the rear surface 20, the front surface 18 is normally reflective of ambient light but will transmit light of all visible wavelengths from the rear surface 20 to the front surface 18. The mirror glass 16 will also appear reflective of ambient light when the rear surface 20 is enclosed by a black surface spaced from the rear surface 20 of the mirror glass 16. Although the entirety of the coating process is not presently known to applicant, the glass is available from Libbey Owens Ford and has many beneficial characteristics.

The mirror glass 16 includes selectively lit lighting sections 28, preferably in the left side 22 and the right side 24 of mirror glass 16. Although the mirror apparatus 10 is described here as having two lighting sections 28 for illustrative purposes, it will be understood that the mirror apparatus 10 could utilize other shapes, locations, and numbers of lighting sections. For example a lighting section could include a band around the periphery of the mirror glass.

A substantially opaque, preferably black, backmasking 30 is disposed on the rear surface 20 of the mirror glass 16, except for the lighting sections 28. Flat black paint can be used as the opaque backmasking 30. Semi-transparent backmasking, preferably a light control film 32, is disposed on the rear surface 20 of the mirror glass 16 on the lighting sections 28. Known light control films 32 commercially available from 3M Company have the property of transmitting light only at predetermined angles with respect to the plane of the film by using microlouvers. As can be seen in FIG. 2A, the light control film 32 has embedded members 33 which create the light directing louvers. The light control film transmits light traveling substantially parallel to the embedded members 33. Other known light control films which transmit light at different angles and which transmit light in wider or narrower ranges of angles may be used. The light control film 32 is selected and oriented so that light traveling through the mirror glass 16 from the rear surface 20 to the front surface 18 is directed as desired from the mirror apparatus 10. For example, in a passenger-side automotive vanity mirror, the light may be transmitted substantially perpendicular to the plane of the mirror to concentrate light toward the passenger and minimize light scattering toward the driver of the vehicle.

A light source 34, such as a fluorescent or incandescent light bulb is disposed within the housing 12 behind mirror glass 16. A light transmission medium 36 such as a light pipe, fiber-optic path, or light conduit disposed on the left side 22 and the right side 24 of the light source 34 transmits light from the light source 34 to the lighting sections 28. The light transmission medium 36 is preferably optically clear plastic wrapped in a reflective sheath 37. Other materials, including air, can be used for the light transmission medium 36.

A light director 38 disposed on each lighting section is preferably a mirror glass 38. Each light director 38 forms an acute angle with the rear surface 20 of the mirror glass 16 to reflect light travelling through the light transmission medium 36 through the lighting sections 28. The light director 38 may have a planar, convex, concave, or aspheric shape. Alternatively, reflective film is attached in-mold during the construction of the light transmission medium 36. The light director 38 could alternatively be a prism.

The present mirror apparatus 10 is less expensive than lighted vanity mirrors requiring separate light-diffusing covers. Further, a larger, continuous reflective front surface 18 is more aesthetically pleasing and useful than a mirror glass bordered by lights and covers. When the user activates the light source 34, light transmitted by light transmission medium 36 is directed by the light directors 38 through light control film 32. The light control film 32 may transmit light travelling substantially perpendicularly to the rear surface 20 of mirror glass 16, thereby concentrating the light toward the user and away from unwanted areas. When the light source 34 is deactivated, the entire front surface 18 of mirror glass 16 is highly reflective of ambient visible light, providing the user with a larger reflective surface than previously available in lighted vanity mirrors.

Alternatively, as shown in FIG. 3, light-directing means 40, such as a light-diffusing lens 40, is disposed between the light transmission medium 36 and the light control film 32. The light-diffusing lens 40 provides the lighting sections 28 with a uniform lighted appearance or glow and reduces the harshness of the light.

Other means for directing light can be used to concentrate, color, filter, or diffuse light, such as a Fresnel lens, a frosted glass lens, or a simple reflector. A wide variety of light sources can be used as the light source 34 in any of the embodiments of the present invention, including LEDs or incandescent or fluorescent light bulbs, which can be utilized in combination with light pipes and fiber-optic cables.

In another embodiment of the present invention shown in FIG. 4, the mirror apparatus 50 includes a light source 52 behind each lighting section 28. Each light source 52 is mounted inside a light reflector 54. Light directing means, such as a light-diffusing lens 56, on each light reflector 54 provides each lighting section 28 with a uniform lighted appearance or glow and reduces the harshness of the light.

In another embodiment of the present invention, shown in FIG. 5, the mirror apparatus 60 includes two light sources 62 disposed behind the opaque backmasking 30, one adjacent each lighting section 28. A pair of highly reflective, concave, preferably aspheric, reflectors 64 are provided between the light sources 62 adjacent each light source 62. A shiny, black reflector 66 is disposed behind each lighting section 28. The black reflectors 66 can be plastic or metal.

On the rear surface 68 of the opaque backmasking 30 adjacent each light source 62, a reflective portion 70 is made reflective of visible light, preferably by painting it white. Similarly, a portion 72 of the interior surface 74 of the housing 12 opposite the reflective portion 68 on the opaque backmasking 30 is made reflective of visible light, preferably by painting it white.

In operation, mirror apparatus 60 provides a mirror glass 16 having a front surface 18, the entirety of which normally provides the user with a reflective view. When the user activates the light sources 62, light is reflected and concentrated by the reflectors 64 and reflective portions 70, 72 onto the black reflectors 66 and through the mirror glass 16 lighting sections 28. When the light sources 62 are deactivated, the black reflectors 66 cause the front surface 18 of the lighting sections 28 to appear highly reflective of visible light, thereby providing the user with a large highly-reflective surface.

Because the light sources 62 are mounted behind the mirror glass 16, separate light-diffusing covers are not necessary. The mirror apparatus 60 is therefore less expensive, and the continuous front surface 18 is more aesthetically pleasing than previous lighted vanity mirrors. Further, when the light sources 62 are deactivated, the mirror apparatus 60 provides a larger reflective front surface 18 than previous lighted vanity mirrors.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mirror apparatus for reflecting and selectively projecting light comprising:

at least one light source selectively generating light;

a mirror glass disposed in front of said at least one light source, substantially all visible light wavelengths being transmittable outwardly through said mirror glass, said mirror glass being reflective of visible ambient light when said at least one light source is not generating said light, said light selectively generated from said at least one light source passing through said mirror glass, said mirror glass including at least one lighting section, said light selectively generated from said at least one light source passing through said at least one lighting section; and a light-transmission medium wrapped in an inwardly-reflective sheath, said light-transmission medium disposed between said at least one light source and said at least one lighting section of said mirror glass, said light-transmission medium transmitting said light to said at least one lighting section.

2. The mirror apparatus of claim 1, wherein said light-transmission medium is an optically clear plastic.

3. A mirror apparatus for reflecting and selectively projecting light comprising:

at least one light source selectively generating light of substantially all visible wavelengths;

a mirror glass disposed in front of said at least one light source, substantially all visible light wavelengths being transmittable outwardly through said mirror glass, said mirror glass being reflective of visible ambient light when said at least one light source is not generating said light, said light selectively generated from said at least one light source passing through said mirror glass, said mirror glass including at least one lighting section, said light selectively generated from said at least one light source passing through said at least one lighting section, said light from said at least one light source not passing through said mirror glass at a section other than said one lighting section.

4. A mirror apparatus for reflecting and selectively projecting light comprising:

at least one light source selectively generating light;

a mirror glass disposed in front of said at least one light source, substantially all visible light wavelengths being transmittable outwardly through said mirror glass, said mirror glass being reflective of visible ambient light when said at least one light source is not generating said light, said light selectively generated from said at least one light source passing through said mirror glass;

said mirror glass including at least one lighting section, said light selectively generated from said at least one light source passing through said at least one lighting section, said light from said at least one light source not passing through said mirror glass at a section other than at least one lighting section said lighting section reflective of visible light when said light source is not generating said light.

5. The mirror apparatus of claim 1, wherein said mirror glass includes a pyrolytic coating.

6. The mirror apparatus of claim 5, wherein said pyrolytic coating includes at least a metal oxide coating layer.

7. The mirror apparatus of claim 4, wherein said at least one light source is mounted in a reflector disposed behind said at least one lighting section, said light from said at least one light source passing through said at least one lighting section.

8. The mirror apparatus of claim 4, further including at least one light-diffusing lens between each said light source and each said lighting section, said light selectively generated by said at least one light source passing through said at least one light-diffusing lens and through said at least one lighting section.

9. The mirror apparatus of claim 4, wherein said light generated from said at least one light source is transmitted through said at least one lighting section at predetermined angles.

10. The mirror apparatus of claim 4, wherein said at least one lighting section includes a semi-transparent backmasking on a rear surface of said mirror glass.

11. The mirror apparatus of claim 10, wherein said semi-transparent backmasking comprises light control film, said light control film transmitting light at predetermined angles.

12. The mirror apparatus of claim 11, wherein said light control film includes louvers to direct said light.

13. The mirror apparatus of claim 10, wherein said mirror glass further includes a substantially opaque backmasking disposed on said rear surface, at locations other than said at least one lighting section.

14. The mirror apparatus of claim 10, wherein said at least one light source is disposed behind said opaque backmasking adjacent said at least one lighting section, said mirror apparatus further including a reflector disposed behind each said lighting section, each said reflector providing each said lighting section with a reflective appearance when said at least one light source is not generating light, each said reflector reflecting light from said at least one light source through each said lighting section when said at least one light source is generating light.

15. The mirror apparatus of claim 4, wherein there are two lighting sections, with one at spaced ends of said mirror glass.

16. The mirror apparatus of claim 4, wherein said light selectively generated by said at least one light source includes substantially all visible light wavelengths, said light of substantially all visible light wavelengths passing through said at least one lighting section of said mirror glass.

17. The mirror apparatus of claim 16, wherein said at least one light source is an incandescent light.

18. A mirror apparatus for reflecting and selectively projecting light comprising:

at least one light source selectively generating light;

a mirror glass extending between two ends and disposed in front of said at least one light source, substantially all visible light wavelengths being transmittable outwardly through said mirror glass, said mirror glass having a first lighting section at a first end and a second lighting section at a second end, an opaque backmasking disposed on a rear surface of said mirror glass at locations other than said lighting sections, a semi-transparent backmasking disposed on the rear surface of said mirror glass at said lighting sections, said lighting sections being reflective of visible ambient light when said at least one light source is not generating said light, said light selectively generated from said at least one light source passing through said lighting sections.

19. The mirror apparatus of claim 18, wherein said semi-transparent backmasking is light-control film, said light-control film directing light at predetermined angles.

20. The mirror apparatus of claim 19, wherein said mirror apparatus is a vanity mirror in a vehicle, said light control film directing said light through said lighting sections away from a driver's position in said vehicle.

* * * * *